United States Patent

[11] 3,557,762

| [72] | Inventor | Boris John Mitchell<br>Birmingham, Mich. |
|---|---|---|
| [21] | Appl. No. | 797,029 |
| [22] | Filed | Feb. 6, 1969 |
| [45] | Patented | Jan. 26, 1971 |
| [73] | Assignee | General Motors Company<br>Detroit, Mich.<br>a corporation of Delaware |

[54] ENGINE WITH VARIABLE OPENING INLET VALVE MEANS
6 Claims, 6 Drawing Figs.

[52] U.S. Cl. ..................... 123/98,
123/79, 123/90, 123/108, 123/188
[51] Int. Cl. ..................... F02d 11/02,
F01l 1/28, F01l 3/00
[50] Field of Search ..................... 123/188,
188(AF), 188(IM), 79C, 108, 98, 90

[56] References Cited
UNITED STATES PATENTS

| 661,181 | 11/1900 | Lambert | 123/108 |
| 794,859 | 7/1905 | Gosse | 123/108 |
| 863,922 | 8/1907 | Housum et al. | 123/108 |
| 1,494,763 | 5/1924 | West | 123/119A |
| 3,035,558 | 5/1962 | Wiebicke et al. | 123/188IM |
| 3,422,803 | 1/1909 | Stivender | 123/90 |

FOREIGN PATENTS

| 578,468 | 6/1946 | Great Britain | 123/79 |
| 1,197,244 | 6/1959 | France | 123/108 |
| 13,161 | 9/1896 | Sweden | 123/108 |

*Primary Examiner*—Wendell E. Burns
*Attorneys*—J. L. Carpenter and Robert J. Outland

ABSTRACT: A valve throttled internal combustion engine having inlet valve means for each cylinder including a poppet valve and a throttle valve, each of which independently cooperates with the combustion chamber inlet port to control the flow of combustible mixture thereto. The poppet valve actuating mechanism moves it cyclically through a fixed stroke so that it controls the timing of the inlet valve openings while the throttle valve is mechanically actuated by the engine operator to vary the maximum size of the inlet port flow passage and thereby the extent of the inlet valve openings.

PATENTED JAN 26 1971

INVENTOR.
Boris John Mitchell
BY
Robert J. Outland
ATTORNEY

INVENTOR.
Boris John Mitchell
BY
Robert J. Outland
ATTORNEY

INVENTOR.
Boris John Mitchell
BY
Robert J. Outland
ATTORNEY

ENGINE WITH VARIABLE OPENING INLET VALVE MEANS

FIELD OF THE INVENTION

This invention relates to internal combustion engines and, more particularly, to engines provided with variable opening inlet valve means adapted to control the flow of combustible mixture into the combustion chambers.

BACKGROUND OF THE INVENTION

The U.S. Pat. application of Donald L. Stivender, Ser. No. 644,369, filed June 7, 1967 and now U.S. Pat. No. 3,422,803, discloses an engine construction and method by which unusually lean mixtures may be burned in the combustion chambers of a spark ignition internal combustion engine. His method of obtaining satisfactory lean mixture operation included the step of controlling the flow of combustible mixture at the cylinder inlet port through variations in the extent of inlet valve openings. In the Stivender construction, the variations in valve openings were provided through mechanism which permitted control of the amount of the maximum inlet valve lift, as desired by the operator, from a predetermined maximum opening position down to zero lift. The advantages of thus throttling the mixture with the inlet valve are shown to be satisfactory engine operation with leaner air fuel mixtures than has been possible with conventional engine constructions.

SUMMARY OF THE INVENTION

The present invention provides internal combustion engine constructions having novel inlet valve means adapted to permit throttling of the air-fuel mixture at the inlet port in a manner such as to permit the practice of the method disclosed and claimed in the aforementioned Stivender patent application. The arrangements are also useful for other methods of operation in which valve throttling, that is throttling at the inlet port, may be desirable.

The instant invention differs from the known prior art structures in that the inlet valve means include two separate valve members for each cylinder which operate independently in cooperation with each inlet port opening to control the extend of inlet valve openings and, thus, the passage of mixture through each inlet port. Preferably, one of these two valve members is a conventional poppet valve actuated by valve mechanism of the usual type to open the poppet valve a predetermined fixed amount during each inlet stroke of the respective engine piston. The variation in extent of openings of the inlet valve means is provided by a second valve member which acts as a throttle valve and is movable within the mixture intake passage between a position closely fitting within and substantially closing the inlet port to a position away from and providing relatively free flow to the inlet port. This second or throttle valve member may be operated by any suitable mechanism under the control of the engine operator and acts to provide the variation in extent of inlet valve openings necessary to control the flow of combustible mixture into the combustion chamber as called for in the aforesaid Stivender patent application.

Various specific embodiments of the present invention are disclosed herein which have an advantage of relatively simpler construction over prior known mechanisms for accomplishing the same purpose. Further features and advantages of the invention will be apparent from the following description of the several alternative embodiments of the invention taken together with the accompanying drawings.

DESCRIPTION OF THE PREFERRED EMBODIMENTS

Figure 1:
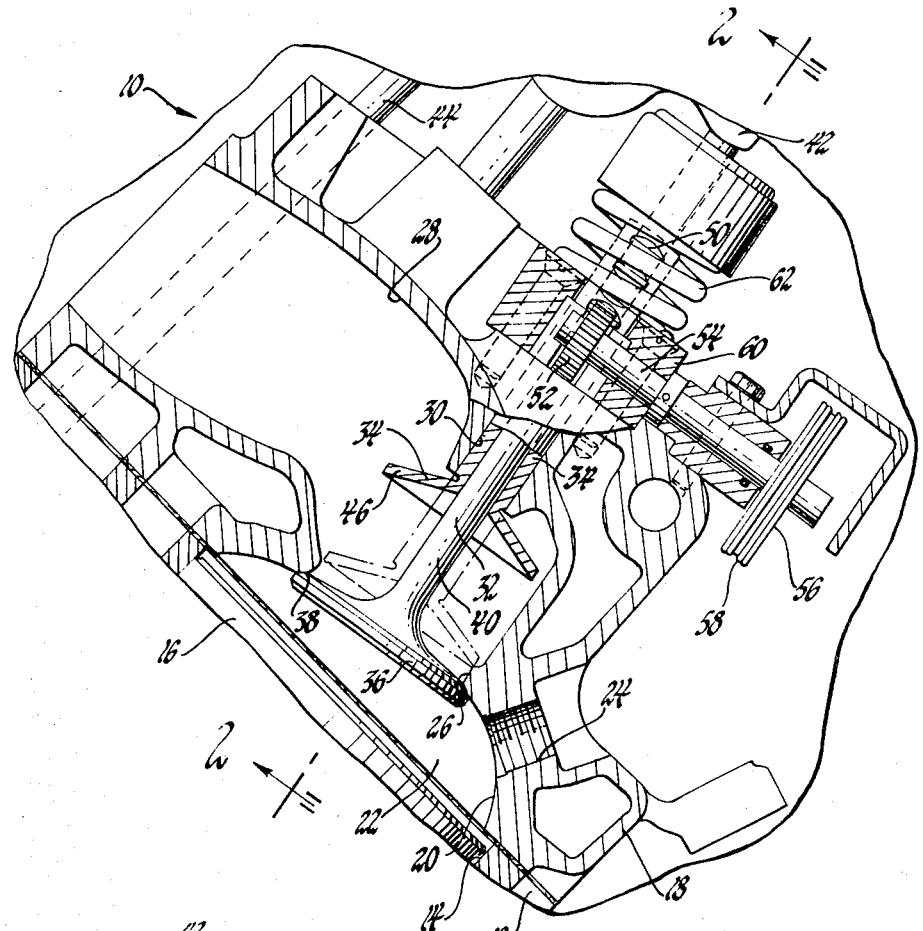
FIG. 1 is a fragmentary transverse cross-sectional view of an internal combustion engine having inlet valve means formed according to the invention.
Figure 2:
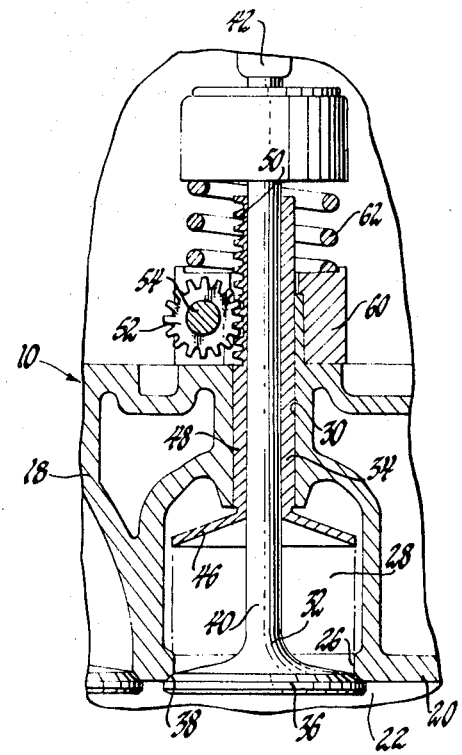
FIG. 2 is a cross-sectional view of the embodiment of FIG. 1 taken generally in the plane indicated by the line 2-2 as viewed in the direction of the arrows.

Referring now to FIGS. 1 and 2 of the drawings, there is shown an internal combustion engine generally indicated by numeral 10. Engine 10 includes a cylinder block 12 having a plurality of cylinders 14 (only one being shown) in each of which is reciprocably disposed a piston 16. On the end of the cylinder block 12 is secured at least one cylinder head 18 which includes an interior wall 20 closing the end of each cylinder and cooperating with the respective cylinder and piston to define a variable volume combustion chamber 22. THe cylinder head 18 further includes for each cylinder a threaded opening 24 adapted to receive a spark plug for igniting a combustible mixture in the combustion chamber.

The cylinder head also provides inlet valve means for each cylinder including a short circular inlet port 26 opening through interior wall 20 and connecting the combustion chamber 22 with an inlet passage 28 formed within the cylinder head 18 and connectable with suitable means (not shown) for supplying a combustible mixture to the engine combustion chamber. A valve guide bore 30 is also provided in which are reciprocably carried a pair of inlet valve members including a poppet valve 32 and a throttle valve 34.

Poppet valve 32 includes the usual head 36 which is engageable with an annular valve seat 38 provided on the inner edge of inlet port 26 so as to close the port to flow therethrough. Valve 32 also includes a stem 40 which is reciprocably carried by valve 34 and is actuable by a rocker arm 42 and pushrod 44. These are connected through conventional means so as to cyclically open the poppet valve 32 during each inlet stroke of the engine piston, the opening movement or lift of the valve being fixed by the design of the actuating mechanism in a known manner.

The throttle valve 34 includes a flared head 46 connected with a hollow stem 48 which is reciprocably received within bore 30 and supports the stem 40 of the poppet valve so that the two valves 32, 34 are coaxially movable. In the drawings, the head 46 of throttle valve 34 is shown in its retracted, or fully open, position such that, when the poppet valve 32 is also open, a free flow of combustible mixture is permitted to flow through inlet port 26 to the combustion chamber 22. The valve throttle 34 is, however, movable downward so that the head 46 moves within the upper end of inlet port 26 into a close fitting relationship therewith, in which position flow through the port is substantially blocked by the head 46 and the closed position of the valve 34.

To provide for control of the movement of throttle valve 34, the upper portion of the stem 48 is provided with teeth 50 which are engaged by the teeth of a pinion gear 52 carried on a shaft 54. The gear and shaft are mechanically operable by the engine operator through suitable mechanism such as pulley 56 and cable 58. A shaft support member 60 secured to the cylinder head carries shaft 54 and also acts as a seat for valve spring 62 which acts in a closing direction on poppet valve 32 in a conventional manner.

In operation, the poppet valve 32 is cyclically actuated by its valve actuating means 42, 44, 62 so as to be open a predetermined amount during each intake stroke of the engine piston, the valve lift and the opening and closing times in the cycle being fixed by the design of the valve actuating means. Variation of the extent of inlet valve openings is accomplished by movement of cable, pulley mechanism 56, 58 which rotates gear 52 and adjusts throttle valve 34 toward or away from the inlet port 26 so as to vary as desired the maximum area through which the combustible mixture may flow when the poppet valve 32 is open.

Operational tests of an engine having valve mechanism made in accordance with the embodiment of FIGS. 1 and 2 resulted in similar lean mixture operational capabilities to those reported for the mechanism of the aforementioned patent application, Ser. No. 644,369.

Figures 3, 4:
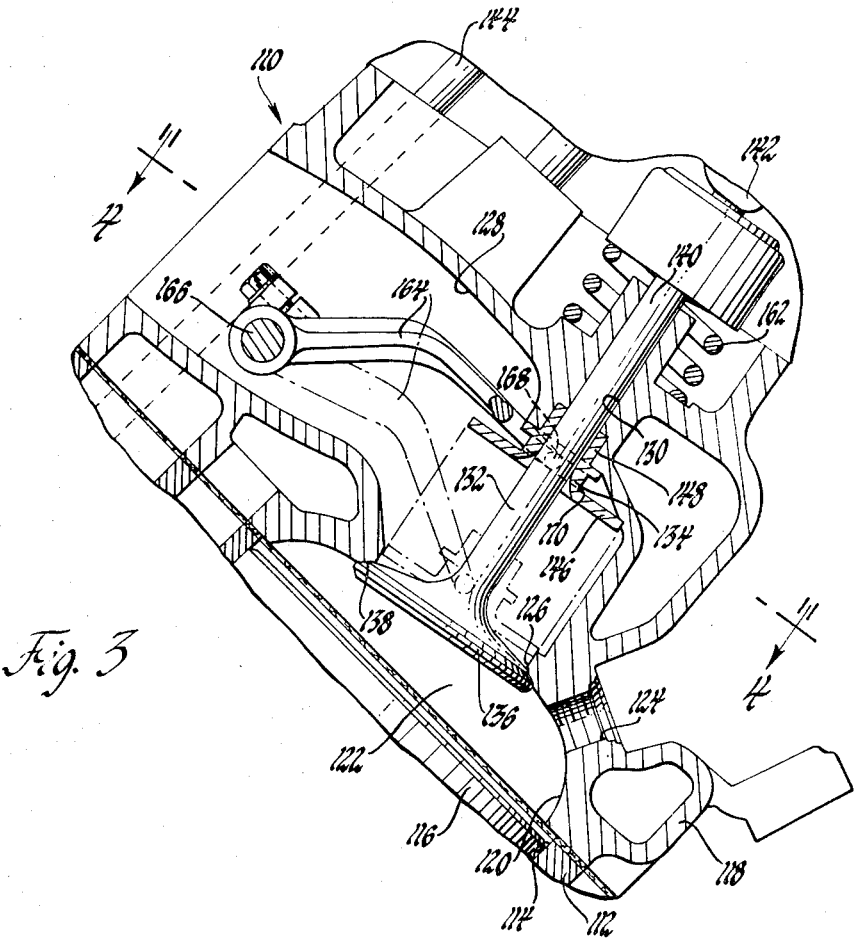
FIG. 3 is a transverse cross-sectional view similar to FIG. 1 but showing an alternative embodiment of inlet valve means formed according to the invention.
FIG. 4 is a cross-sectional view of the embodiment of FIG. 3 taken generally in the plane indicated by the line 4-4 as viewed in the direction of the arrows.

Referring now to FIGS. 3 and 4 of the drawings, an alternative embodiment is shown of an internal combustion engine having inlet valve means according to the present invention. As many of the components and elements of this arrangement are similar to comparable elements of the embodiment of FIGS. 1 and 2, they will be identified by reference numerals 100 higher in number and will not be further described.

Differences in the embodiment of FIGS. 3 and 4 over that previously described include the fact that the valve guide bore 130 directly supports the stem 140 of the poppet valve 132, the remaining portions of the poppet valve and its actuating mechanism being substantially as in the embodiment of FIGS. 1 and 2. The primary difference is in the throttle valve member 134 which comprises an annular disclike head 146 carried by a short cylindrical stem 148 which is slidably supported on the stem 140 of the poppet valve and is movable along this stem so as to open or close the inlet port 126 in the same manner as the throttle valve in the previously described embodiment. Movement of throttle valve 134 is accomplished by a lever 164 located within inlet passage 128 and secured to an oscillatable control shaft 166 carried by the cylinder head 118. The outer end of lever 164 is bifurcated and has opposed tongues 168 which are received within an annular recess 170 of the throttle valve 134 such that oscillation of shaft 166 acts through lever 164 to move valve 134 between its open and closed positions. Through connection with the levers 164 of other cylinders, shaft 166 may be arranged to control together the throttle valves 134 of all cylinders of one bank.

Figures 5, 6:
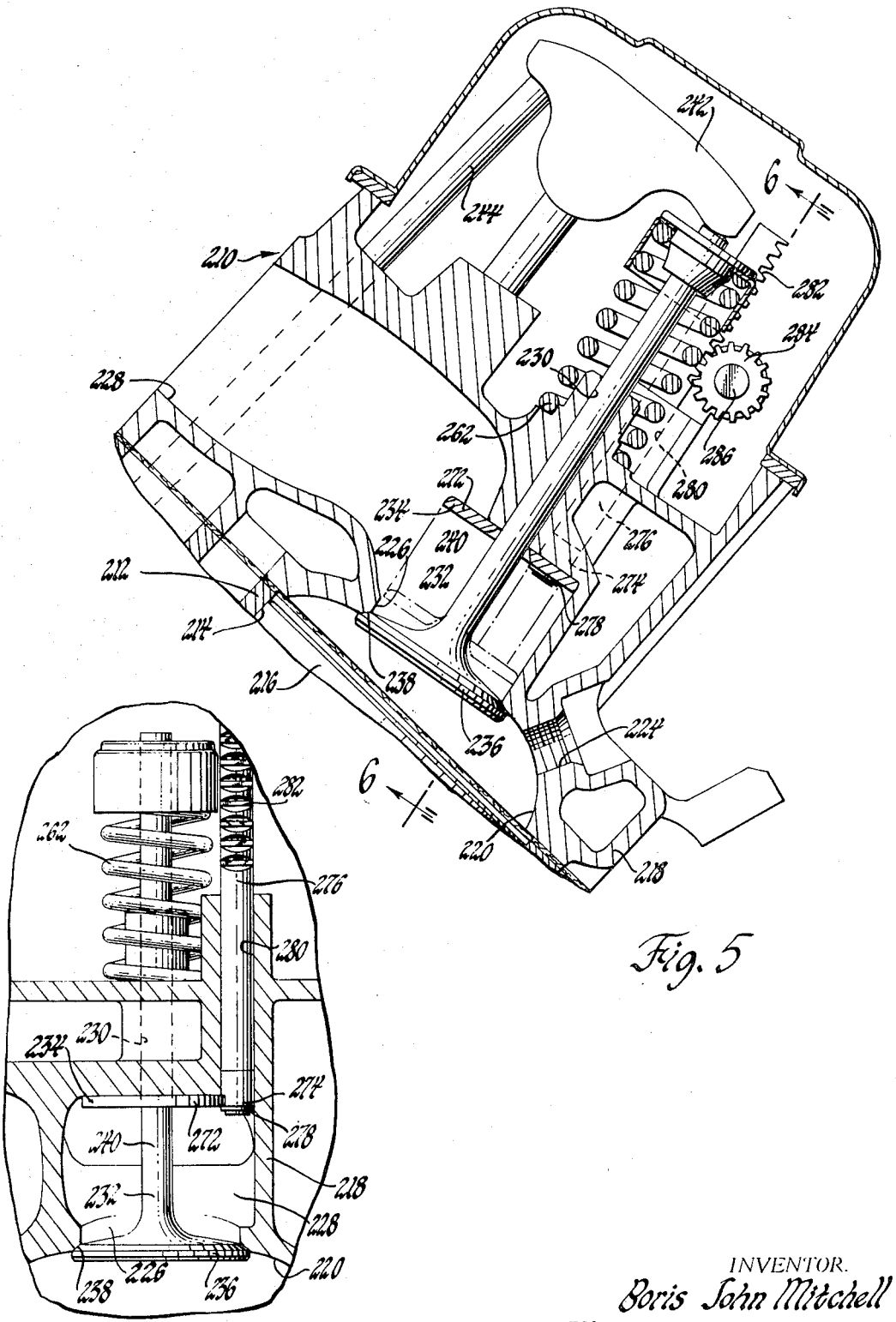
FIG. 5 is a transverse cross-sectional view similar to FIGS. 1 and 3 but showing a third embodiment of inlet valve means according to the invention.
FIG. 6 is a cross-sectional view of the embodiment of FIG. 5 taken generally in the plane indicated by the line 6-6 as viewed in the direction of the arrows.

Referring now to FIGS. 5 and 6 of the drawings, there is shown a different embodiment of an engine including valve means according to the invention. As before, many of the components and elements are similar to those of the embodiment of FIGS. 3 and 4, and these are identified by reference numerals 100 higher in number.

The primary difference in the embodiment of FIGS. 5 and 6 from those previously described is in the throttle valve 234 which comprises a disclike head member 272 formed together with a hollow sleeve 274 which is received over the reduced end of an offset valve stem 276 and is retained thereon by a snap ring 278 or other suitable means. Valve stem 276 is reciprocably carried in a bore 280 spaced from and parallel with the poppet valve guide bore 230. Teeth 282 are formed on the upper end of valve stem 276 and are engaged by the teeth of a pinion gear 284 which is in turn rotatably actuable through a manually rotatable shaft 286.

The operation of the embodiments of FIGS. 3 and 4 and FIGS. 5 and 6 is generally similar to that of FIGS. 1 and 2, the differences being in the specific constructions of the parts, in particular the throttle valves and their actuating mechanisms.

The above described embodiments are only three of many possible arrangements which might be made within the scope of the instant invention so as to provide inlet valve means comprising a first valve, which is preferably a poppet valve, to control the timing of the inlet valve opening and a second valve, or throttle valve, to control the extent of the inlet valve openings, both valve members acting directly in cooperation with the inlet port defining means.

I claim:

1. In combination with an internal combustion engine of the type having a cylinder defining a variable volume combustion chamber and means defining an inlet passage to deliver combustible mixture to said combustion chamber. inlet valve means in a wall of said combustion chamber and openable to control the intake of combustible mixture into said combustion chamber, said inlet valve means comprising:

means defining an inlet port opening through said combustion chamber wall and connecting said combustion chamber with said inlet passage, said inlet port means having an annular valve seat around said port on the combustion chamber side thereof;

a poppet valve member extending through said inlet port and reciprocably movable into and out of engagement with said valve seat to respectively close and open said port to flow therethrough;

a throttle valve member having an imperforate annular head reciprocably movable on the same axis as said poppet valve member into and out of a close fitting position within said inlet port and closely adjacent said valve seat to respectively substantially close and open said port to flow therethrough;

first actuating means connected with said poppet valve member and adapted to cyclically move said poppet valve member between its open and closed positions so as to control the timing of the inlet valve openings; and second actuating means connected with said throttle valve member and actuable to vary its position as desired so as to vary the extent of the inlet valve openings.

2. In combination with an internal combustion engine of the type having a cylinder block, a cylinder head closing the end of said cylinder block comprising; defining therewith a variable volume combustion chamber and an inlet passage in said cylinder head to deliver combustible mixture to said combustion chamber:

inlet valve means carried by said cylinder head and openable to control the intake of combustible mixture into said combustion chamber, said inlet valve means comprising;

means defining a short circular inlet port opening through a wall of said cylinder head and connecting said combustion chamber with said inlet passage, said inlet port means having an annular valve seat extending around said port on the combustion chamber side thereof;

a poppet valve member having a head portion engageable with said valve seat and a stem portion extending through said inlet port, said poppet valve member being supported by said cylinder head for reciprocating movement into and out of engagement with said valve seat to respectively close and open said inlet port to flow therethrough;

a throttle valve member reciprocably carried in said cylinder head and having an imperforate annular head member disposed around said poppet valve stem for reciprocating movement within said inlet passage into and out of a close fitting position within said inlet port and closely adjacent said valve seat to respectively substantially close and open said port to flow therethrough;

first actuating means connected with said poppet valve member and adapted to cyclically move said poppet valve member between its open and closed positions so as to control the timing of the inlet valve openings; and second actuating means connected with said throttle valve member and actuable to vary its position as desired so as to vary the extent of the inlet valve openings.

3. The combination of claim 2 wherein said throttle valve member includes a hollow stem portion concentrically surrounding said poppet valve stem and slidably movable thereon.

4. The combination of claim 3 wherein said throttle valve hollow stem is received in a bore of said cylinder head and reciprocably supports said poppet valve stem, said second actuating means including a pinion gear supported on the cylinder head and engaging teeth formed in the throttle valve stem, said pinion gear being rotatably move to vary the position of said throttle valve.

5. The combination of claim 3 wherein said second actuating means comprises a lever carried within said inlet passage on a control shaft and adapted for oscillating movement therewith, said throttle valve having an annular recess and said lever having a bifurcated end portion engaging said annular recess to provide for movement of said throttle valve by said control shaft.

6. The combination of connected with said annular head member and reciprocably carried 2 wherein said poppet valve stem is received in a bore of said cylinder head arranged coaxially with said inlet port, said throttle valve having a stem portion eccentrically connected with said annular head member and reciprocably carried in a second bore of said cylinder head parallel with and offset from said first named bore and said second actuating means includes a pinion gear secured to a rotatable shaft and in engagement with teeth formed on said throttle valve stem portion for positioning said throttle valve.

PO-1050
(5/69)

UNITED STATES PATENT OFFICE
CERTIFICATE OF CORRECTION

Patent No. __3,557,762__   Dated __January 26, 1971__

Inventor(s) __Boris John Mitchell__

It is certified that error appears in the above-identified patent and that said Letters Patent are hereby corrected as shown below:

In the references cited, under foreign patents, Patent No. 13,161 "Sweden" should be --Switzerland--.

Column 1, Line 45, "extend" should be --extent--.

In Column 4, Line 33, "comprising should be --and--.

Line 74, "move" should be --movable--.

In Column 5, Lines 10 and 11, "connected with said annular head member and reciprocably carried" should be --Claim--.

Signed and sealed this 29th day of February 1972.

(SEAL)
Attest:

EDWARD M. FLETCHER, JR.
Attesting Officer

ROBERT GOTTSCHALK
Commissioner of Patents